United States Patent
Song et al.

(10) Patent No.: US 10,558,562 B2
(45) Date of Patent: Feb. 11, 2020

(54) DATA STORAGE DEVICE AND OPERATING METHOD THEREOF

(71) Applicant: SK hynix Inc., Gyeonggi-do (KR)

(72) Inventors: Hae Lyong Song, Gyeonggi-do (KR); Woong Sik Shin, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 12 days.

(21) Appl. No.: 15/615,954

(22) Filed: Jun. 7, 2017

(65) Prior Publication Data

US 2018/0217928 A1   Aug. 2, 2018

(30) Foreign Application Priority Data

Feb. 1, 2017 (KR) .................. 10-2017-0014457

(51) Int. Cl.
*G06F 12/02* (2006.01)

(52) U.S. Cl.
CPC .................. *G06F 12/0246* (2013.01)

(58) Field of Classification Search
None
See application file for complete search history.

(56) References Cited

U.S. PATENT DOCUMENTS

| 2015/0347295 A1* | 12/2015 | Ihm | G06F 12/0253 711/103 |
| 2017/0255550 A1* | 9/2017 | Kim | G06F 12/0253 |
| 2017/0300410 A1* | 10/2017 | Zhang | G06F 12/0253 |

FOREIGN PATENT DOCUMENTS

KR   101477047   12/2014

* cited by examiner

*Primary Examiner* — Denise Tran
(74) *Attorney, Agent, or Firm* — IP & T Group LLP

(57) ABSTRACT

A method for operating a data storage device includes determining an $n^{th}$ garbage collection throughput by multiplying a rate of a number of used pages of an open memory block to an amount of write data to be processed to a sum of the number of used empty memory blocks and an immediately previous garbage collection throughput average value; and performing a garbage collection operation based on the $n^{th}$ garbage collection throughput.

11 Claims, 10 Drawing Sheets

$$GCTH(n) = \left[ \#UEB + MEAN(GCTH\_P) \right] \times \left[ \frac{\#UP\_OB}{PWD} \times 100 \right]$$

FIG.4B

$$\#UEB = MIN(EB) - REB$$

FIG.4C

$$MEAN\ (GCTH\_P) = \frac{GCTH(n-2) + GCTH(n-1)}{2}$$

FIG.4D

$$PWD = \left\lceil \frac{WD}{PS} \right\rceil$$

DATA STORAGE DEVICE AND OPERATING METHOD THEREOF

CROSS-REFERENCES TO RELATED APPLICATION

The present application claims priority under 35 U.S.C. § 119(a) to Korean application number 10-2017-0014457, filed on Feb. 1, 2017, in the Korean Intellectual Property Office, which is incorporated herein by reference in its entirety.

BACKGROUND

1. Technical Field

Various embodiments generally relate to a data storage device that uses a nonvolatile memory device as a storage medium.

2. Related Art

Recently, the paradigm for the computer environment has been shifting into ubiquitous computing so that computer systems can be used anytime and anywhere. Due to this fact, the use of portable electronic devices such as mobile phones, digital cameras, and notebook computers has rapidly increased. In general, such portable electronic devices use a data storage device which uses a memory device. A data storage device is used to store data which are used in a portable electronic device.

A data storage device using a memory device provides advantages in that, since there is no mechanical driving part, stability and durability are excellent, an information access speed is high and power consumption is small. Data storage devices having such advantages include a universal serial bus (USB) memory device, memory cards having various interfaces, a universal flash storage (UFS) device, and a solid state drive (SSD).

SUMMARY

Various embodiments are directed to a data storage device capable of performing an optimized garbage collection operation, and an operating method thereof.

In an embodiment, a method for operating a data storage device may include: determining an $n^{th}$ garbage collection throughput by multiplying a rate of a number of used pages of an open memory block to an amount of write data to be processed to a sum of the number of used empty memory blocks and an immediately previous garbage collection throughput average value; and performing a garbage collection operation based on the $n^{th}$ garbage collection throughput.

In an embodiment, a data storage device may include: a memory device; and a controller suitable for controlling the memory device. The controller determines an $n^{th}$ garbage collection throughput by multiplying a rate of a number of used pages of an open memory block to an amount of write data to be processed to a sum of the number of used empty memory blocks and an immediately previous garbage collection throughput average value. The controller performs a garbage collection operation based on the $n^{th}$ garbage collection throughput.

According to the embodiments, the garbage collection operation of a data storage device may be optimized, and due to this fact, the operating speed of the data storage device may be enhanced.

BRIEF DESCRIPTION OF THE DRAWINGS

The above and other features and advantages of the present invention will become more apparent to those skilled in the art to which the present invention pertains by the following detailed description with reference to the attached drawings in which:

FIG. 3 is a diagram illustrating a garbage collection operation performed by a garbage collection module of FIG. 2.

FIGS. 4A to 4D are equations illustrating a method for determining a garbage collection throughput in accordance with an embodiment of the present invention.

DETAILED DESCRIPTION

Figure 1:
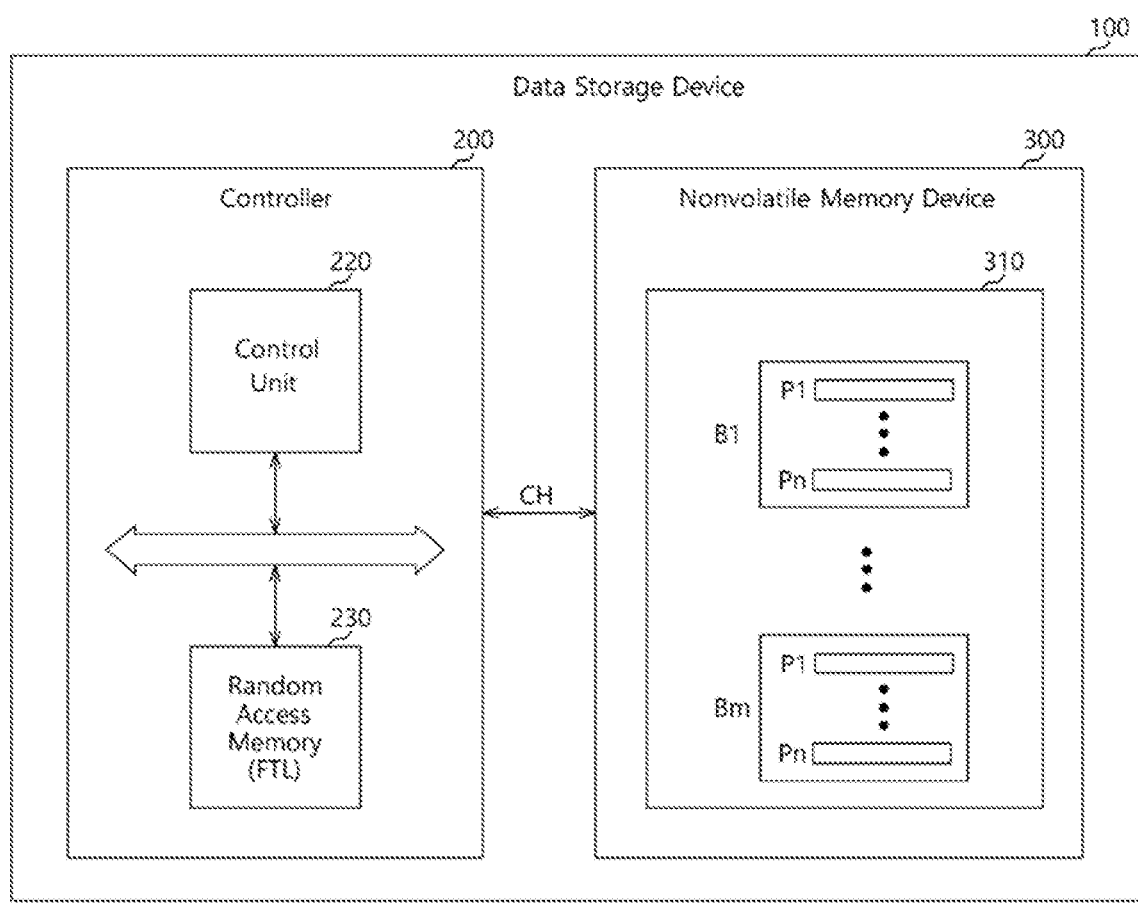
FIG. 1 is a block diagram illustrating a data storage device in accordance with an embodiment of the present invention.

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or Intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device and an operating method thereof will be described below with reference to the accompanying drawings through various examples of embodiments.

FIG. 1 is a block diagram illustrating a data storage device 100 in accordance with an embodiment of the present invention. The data storage device 100 may store data which may be accessed by a host device (not shown) such as a mobile phone, an MP3 player, a laptop computer, a desktop computer, a game player, a TV, an in-vehicle infotainment system, and so forth. The data storage device 100 may also be referred to as a memory system.

The data storage device 100 may be manufactured as any one of various kinds of storage devices according to the protocol of an interface which is electrically coupled with the host device. For example, the data storage device 100 may be configured as any one of various kinds of storage devices such as a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so forth.

The data storage device 100 may be manufactured as any one among various kinds of package types. For example, the data storage device 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a controller 200. The controller 200 may include a control unit 220 and a random access memory 230.

The control unit 220 may drive an instruction or an algorithm of a code type, that is, a software, and may analyze and process a request inputted from the host device. The control unit 220 may control a nonvolatile memory device 300 through a memory control unit (not shown) to process a request from the host device.

The random access memory 230 may store a software to be driven by the control unit 220. Also, the random access memory 230 may store data necessary for the driving of the software, for example, metadata. That is to say, the random access memory 230 may operate as the working memory of the control unit 220. The random access memory 230 may temporarily store data to be transmitted from the host device to a nonvolatile memory device 300 or from the nonvolatile memory device 300 to the host device. In other words, the random access memory 230 may operate as a data buffer memory. The random access memory 230 may also operate as a data cache memory.

The data storage device 100 may include the nonvolatile memory device 300. The nonvolatile memory device 300 may operate as the storage medium of the data storage device 100. The nonvolatile memory device 300 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide. The ferroelectric random access memory (FRAM), the magnetic random access memory (MRAM), the phase change random access memory (PCRAM) and the resistive random access memory (RERAM) are nonvolatile random access memory devices capable of random access to memory cells. In an embodiment, the nonvolatile memory device 300 may be configured by a combination of a NAND flash memory device and at least one of other above-described nonvolatile random access memory devices. In the following description, the nonvolatile memory device 300 configured by a NAND flash memory device (hereinafter, referred to as a flash memory device) will be exemplified.

The flash memory device 300 may include a memory cell region 310. From an operational viewpoint or a physical (or structural) viewpoint, the memory cells included in the memory cell region 310 may be configured into a hierarchical memory cell set or memory cell unit. For example, memory cells which are coupled to the same word line and are to be read and written (or programmed) simultaneously may be configured as a page P. In the following descriptions, for the sake of convenience in explanation, memory cells configured as a page P will be referred to as a "page." Also, memory cells which can be erased simultaneously may be configured as a memory block B. The memory cell region 310 may include a plurality of memory blocks B1 to Bm, and each of the memory blocks B1 to Bm may include a plurality of pages P1 to Pn.

Figure 2:
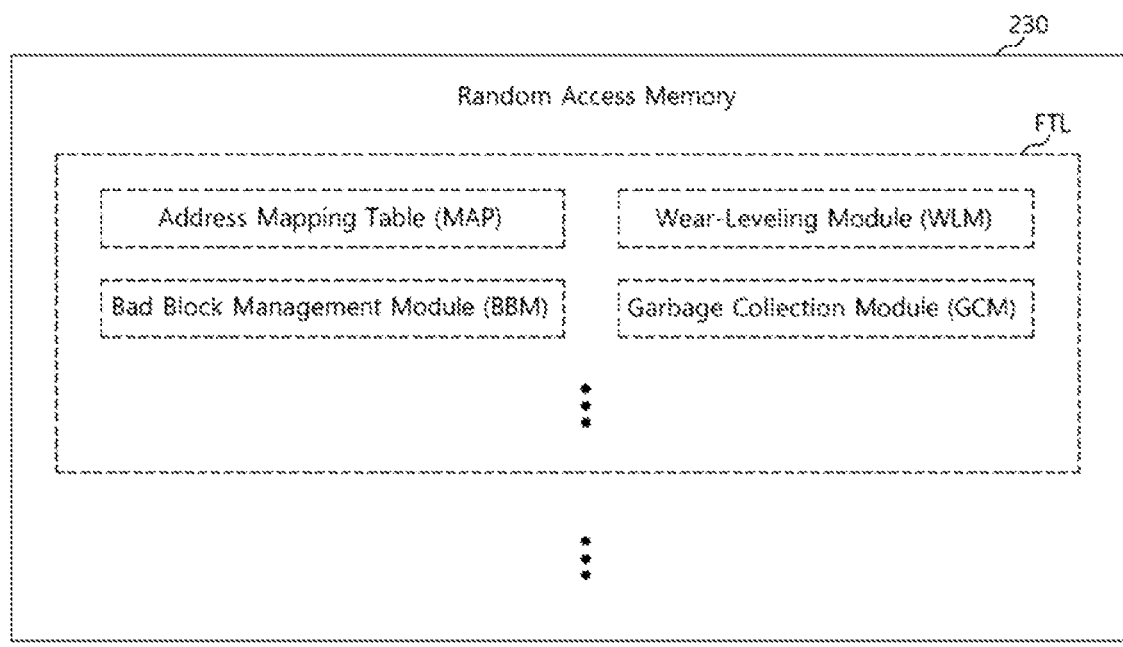
FIG. 2 is a diagram illustrating a software to be driven in a random access memory shown in FIG. 1.

FIG. 2 is a diagram Illustrating a software to be driven in the random access memory 230 shown in FIG. 1.

The control unit 220 of the data storage device 100 may drive a software referred to as a flash translation layer FTL, to control intrinsic operations of the flash memory device 300 and provide device compatibility to the host device. Through driving of such a flash translation layer FTL, the data storage device 100 may be recognized and used as a general data storage device such as a hard disk, by the host device.

The flash translation layer FTL loaded on the random access memory 230 may include modules for performing various functions and metadata for driving of the modules. For example, when referring to FIG. 2, the flash translation layer FTL may include an address mapping table MAP, a wear-leveling module WLM, a bad block management module BBM, and a garbage collection module GCM. The configuration of the flash translation layer FTL is not limited to the above-described modules, and may further include modules such as an interleaving module for operating in parallel flash memory devices 300, a sudden power-off management module for being prepared for an unexpected power-off, and so forth.

In the case where the host device accesses the data storage device 100 (for example, requests a read operation or a write operation), the host device may provide a logical address to the data storage device 100. The flash translation layer FTL may translate the provided logical address into a physical address of the flash memory device 300, and perform a requested operation by referring to the translated physical address. For performing an address translation operation, address translation data, e.g., the address mapping table MAP may be included in the flash translation layer FTL.

The wear-leveling module WLM may manage wear levels of the memory blocks B1 to Bm of the flash memory device 300. Memory cells of the flash memory device 300 may be aged by an erase operation and a write operation. When the number of erase and write operations of a memory cell surpasses a predetermined threshold number the memory cell may become defective. That is, worn-out memory cells may cause fails (for example, physical defects). The wear-leveling module WLM may manage the erase-write counts of respective memory blocks in such a way as to be leveled, in order to prevent a certain memory block from being worn out earlier than the other memory blocks.

The bad block management module BBM may manage a memory block in which a fail has occurred, among the memory blocks B1 to Bm of the flash memory device 300. As described above, a fail (for example, a physical defect) may occur in a worn-out memory cell. Data stored in a failed memory cell may not be read out normally. Moreover, data may not be stored normally in a failed memory cell. The bad block management module BBM may manage a memory block including a failed memory cell, in such a way as not to be used.

The flash memory device 300 does not support overwrite of data due to a structural characteristic thereof. That is to say, it is impossible to store data in a memory cell already written with data. Therefore, in order to rewrite data in a memory cell which already stores data, an erase operation should be preceded. This is referred to as an erase-before-write operation.

The erase operation of the flash memory device 300 requires a lengthy time. For this reason, the control unit 220 stores data to be written in a memory cell which is already written with data, in a different memory cell which has already returned to an erase state. By this operation of the control unit 220, valid data and invalid data are mixed in the flash memory device 300. As the occasion demands, the control unit 220 may perform a series of operations of collecting valid data to a place and erasing invalid data, that is, a garbage collection operation. The garbage collection operation may be referred to as a merge operation.

The garbage collection module GCM may perform the garbage collection operation for the flash memory device 300. The garbage collection operation performed by the garbage collection module GCM will be described below in detail with reference to FIG. 3.

Figures 3, 4A:
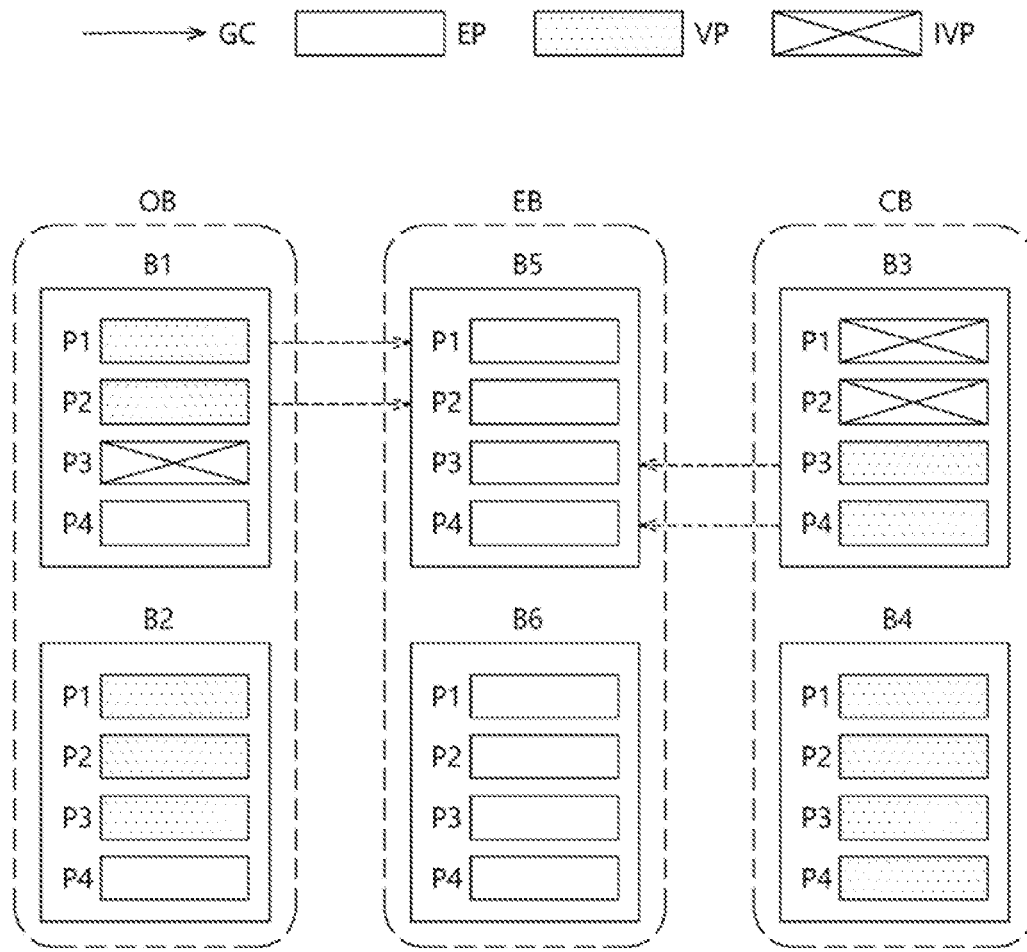

FIG. 3 is a diagram illustrating the garbage collection operation performed by the garbage collection module GCM of FIG. 2. For illustrative purposes, 6 memory blocks B1 to B6 each including 4 pages P1 to P4 will be exemplified. However, it should be understood that the number of memory blocks which configure the memory cell region 310 and the number of pages which are included in each memory block may be changed variously.

The memory blocks B1 to B6 may be classified into empty memory blocks EB, open memory blocks OB and closed memory blocks CB according to an operation status thereof.

An empty memory block EB may be defined as a memory block in which no data is written, like the memory blocks B5 and B6. Hence, an empty memory block EB may include only empty pages EP. The data storage device 100 may employ an empty memory region, that is, an empty memory block EB for an internal operation such as a garbage collection operation GC. In order to allow an internal operation to be performed smoothly, at least a minimum number of empty memory blocks EB should be secured. The number of empty memory blocks EB which should be secured to allow an internal operation to be performed smoothly is defined as the number of minimum empty memory blocks MIN(EB).

An open memory block OB (e.g., memory blocks B1 and B2 in FIG. 3), may be defined as a memory block having data written in some but not all of its pages. Hence, an open memory block OB still has empty one or more pages for data to be written therein. Stated otherwise an open memory block may be a memory block in which a write operation is in progress with some data already written in one or more of its pages, like the memory blocks B1 and B2. The open memory block OB may include a valid page VP in which valid data is stored, an invalid page in which invalid data is stored, and an empty page EP.

A closed memory block CB (e.g., memory blocks B3 and B4 in FIG. 3), may be defined as a memory block having all of its pages written with data in full. Hence, a closed memory block CB does not have any empty memory space for data to be written therein. A closed memory block CB may include one or more valid pages VP and one or more invalid pages IVP. In FIG. 3, pages P1 and P2 of the memory block B3 and page P3 of the memory block B1 are invalid pages IVP.

During a garbage collection operation GC, pages selected as targets of the garbage collection operation GC which are among the valid pages VP of the open memory blocks OB and the closed memory blocks CB may be copied to an empty memory block EB. For example, data of valid pages P1 and P2 of the memory block B1 may be copied to empty pages P1 and P2 of the memory block B5, respectively. Also, data of valid pages P3 and P4 of the memory block B3 may be copied to empty pages P3 and P4 of the memory block B5, respectively. A memory block (e.g., the memory block B3) of which data of all valid pages VP are copied to empty pages of an empty memory block may then be erased to become an empty memory block EB.

Because the garbage collection operation GC includes a write operation of copying data of valid pages VP to pages of an empty memory block EB and an erase operation of erasing a memory block of which data of all valid pages VP are copied, the garbage collection operation GC may consume much of the resources of the controller 200 and take a lengthy operation time. While the garbage collection operation GC may be performed as an internal operation of the controller 200 irrespective of a request from a host device, it may be performed while performing a request from the host device. Therefore, optimizing (i.e., reducing) a time required to perform the garbage collection operation GC or process a throughput of a garbage collection operation GC, may also significantly optimize (i.e., increase) the operating speed of the data storage device 100 and the responding speed of the data storage device 100 for performing a request from the host device.

FIGS. 4A to 4D are equations illustrating a method for determining garbage collection throughput in accordance with an embodiment of the present invention. The garbage collection throughput may be calculated according to equations shown in FIGS. 4A to 4D.

Referring to FIG. 4A, an $n^{th}$ garbage collection throughput GCTH(n) may be determined depending on the sum of the number of used empty memory blocks #UEB and an immediately previous garbage collection throughput average value MEAN(GCTH_P) (see first parenthesis term of right side of the equation of FIG. 4A). Also, the $n^{th}$ garbage collection throughput GCTH(n) may be determined depending on a rate of a number of used pages of an open memory block #UP_OB to an amount of data write-requested from a host device PWD (see second parenthesis term of right side of the equation of FIG. 4A). The $n^{th}$ garbage collection throughput GCTH(n) may be obtained through multiplication of the first and second parenthesis terms of right side of the equation, as shown in FIG. 4A.

Referring to FIG. 4B, the number of used empty memory blocks #UEB may be calculated by subtracting the number of remaining empty memory blocks REB from the number of minimum empty memory blocks MIN(EB). The number of used empty memory blocks #UEB may serve as a variable for reflecting, on the garbage collection throughput GCTH(n), a difference between the number of minimum empty memory blocks MIN(EB) and the number of remaining empty memory blocks REB, that is, the degree of urgency for garbage collection.

Referring to FIG. 4C, the immediately previous garbage collection throughput average value MEAN(GCTH_P) may be calculated by averaging an $(n-2)^{th}$ garbage collection throughput GCTH(n-2) and an $(n-1)^{th}$ garbage collection throughput GCTH(n-1). The immediately previous garbage collection throughput average value MEAN(GCTH_P) may serve as a variable for minimizing an error by an abrupt change in the garbage collection throughput.

The rate of the number of used pages of an open memory block #UP_OB to the amount of write data to be processed PWD may serve as a variable for reflecting an amount of garbage collection to be followed to process write data. Referring to FIG. 4D, the amount of write data to be processed PWD may be determined by dividing an amount of write data WD by the size of a page PS and then ceiling a resultant value (as calculated by a ceiling function expressed by the mathematical symbol "⌈ ⌉"). That is to say, the amount of write data to be processed PWD may mean the maximum number of pages to be written to process write data.

Figure 5:
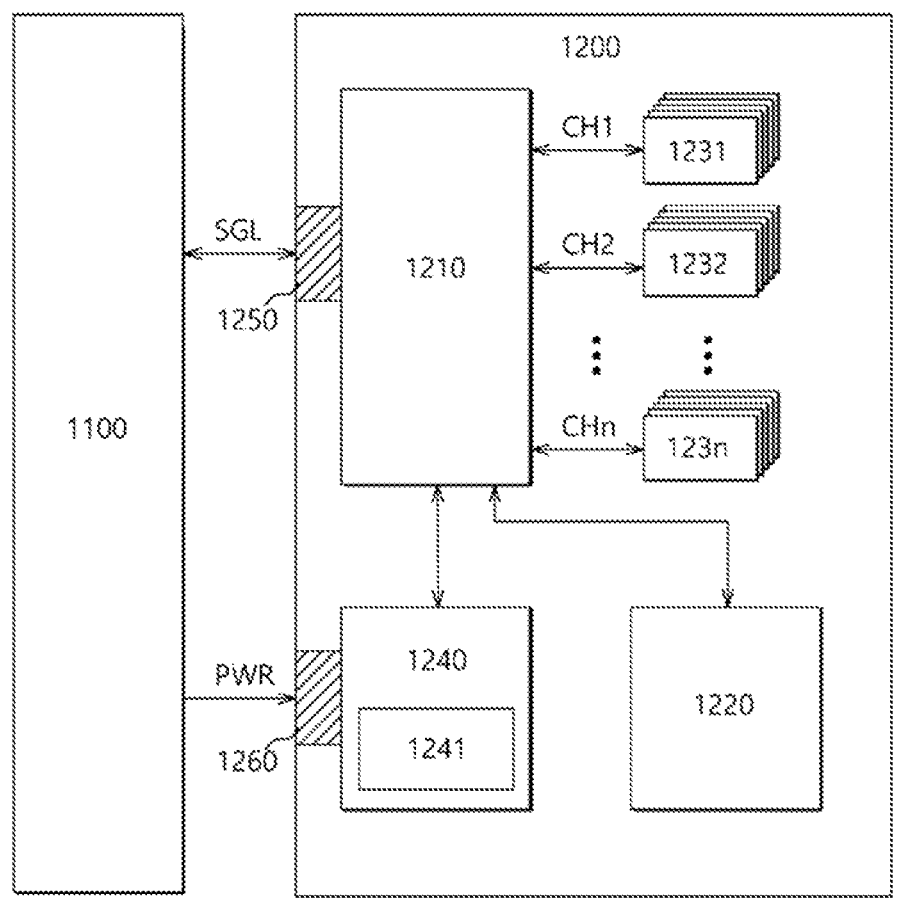
FIG. 5 is a diagram illustrating a data processing system including a solid state drive (SSD) in accordance with an embodiment of the invention.

FIG. 5 is a diagram illustrating a data processing system including a solid state drive (SSD) in accordance with an embodiment of the present invention. Referring to FIG. 5, a data processing system 1000 may include a host device 1100 and a solid state drive (SSD) 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200.

The buffer memory device 1220 may temporarily store data to be stored in the nonvolatile memory devices 1231 to 123n. Further, the buffer memory device 1220 may temporarily store the data read out from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of corresponding channels CH1 to CHn. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacitance capacitors capable of charging power PWR.

The controller 1210 may exchange a signal SGL with the host device 1100 through the signal connector 1250. The signal SGL may include a command, an address, data, and so forth. The signal connector 1250 may be constructed by various types of connectors depending on an interface scheme between the host device 1100 and the SSD 1200.

Figure 6:
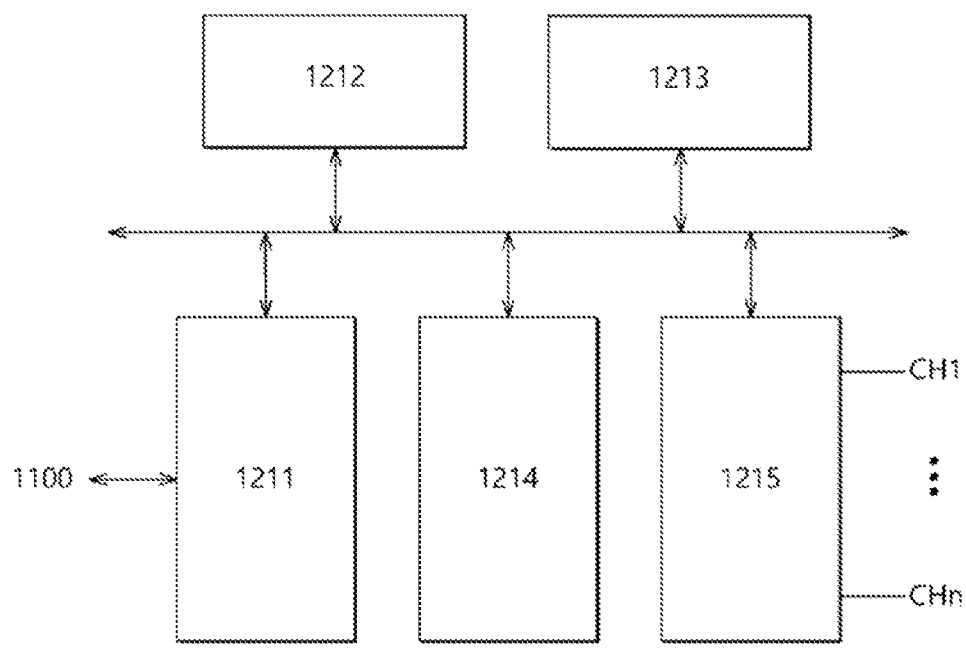
FIG. 6 is a diagram illustrating an exemplary configuration of a controller shown in FIG. 5.

FIG. 6 is a diagram illustrating an exemplary configuration of the controller shown in FIG. 5. Referring to FIG. 6, the controller 1210 may include a host interface unit 1211, a control unit 1212, a random access memory 1213, an error correction code (ECC) unit 1214, and a memory interface unit 1215.

The host interface unit 1211 may interface the host device 1100 and the SSD 1200 according to the protocol of the host device 1100. For example, the host interface unit 1211 may communicate with the host device 1100 through any one of secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS) protocols. In addition, the host interface unit 1211 may perform a disk emulating function for supporting the host device 1100 to recognize the SSD 1200 as a general purpose data storage device, for example, a hard disk drive (HDD).

The control unit 1212 may analyze and process the signal SGL inputted from the host device 1100. The control unit 1212 may control operations of internal function blocks according to a firmware or a software for driving the SSD 1200. The random access memory 1213 may be used as a working memory of the control unit 121 storing such a firmware or software.

The error correction code (ECC) unit 1214 may generate parity data of data to be transmitted to the nonvolatile memory devices 1231 to 123n. The generated parity data may be stored together with the data in the nonvolatile memory devices 1231 to 123n. The error correction code (ECC) unit 1214 may detect an error of the data read out from the nonvolatile memory devices 1231 to 123n, based on the parity data. If a detected error is within a correctable range, the error correction code (ECC) unit 1214 may correct the detected error.

The memory interface unit 1215 may provide control signals such as commands and addresses to the nonvolatile memory devices 1231 to 123n, according to control of the control unit 1212. Moreover, the memory interface unit 1215 may exchange data with the nonvolatile memory devices 1231 to 123n, according to control of the control unit 1212. For example, the memory interface unit 1215 may provide the data stored in the buffer memory device 1220, to the nonvolatile memory devices 1231 to 123n, or provide the data read out from the nonvolatile memory devices 1231 to 123n, to the buffer memory device 1220.

Figure 7:
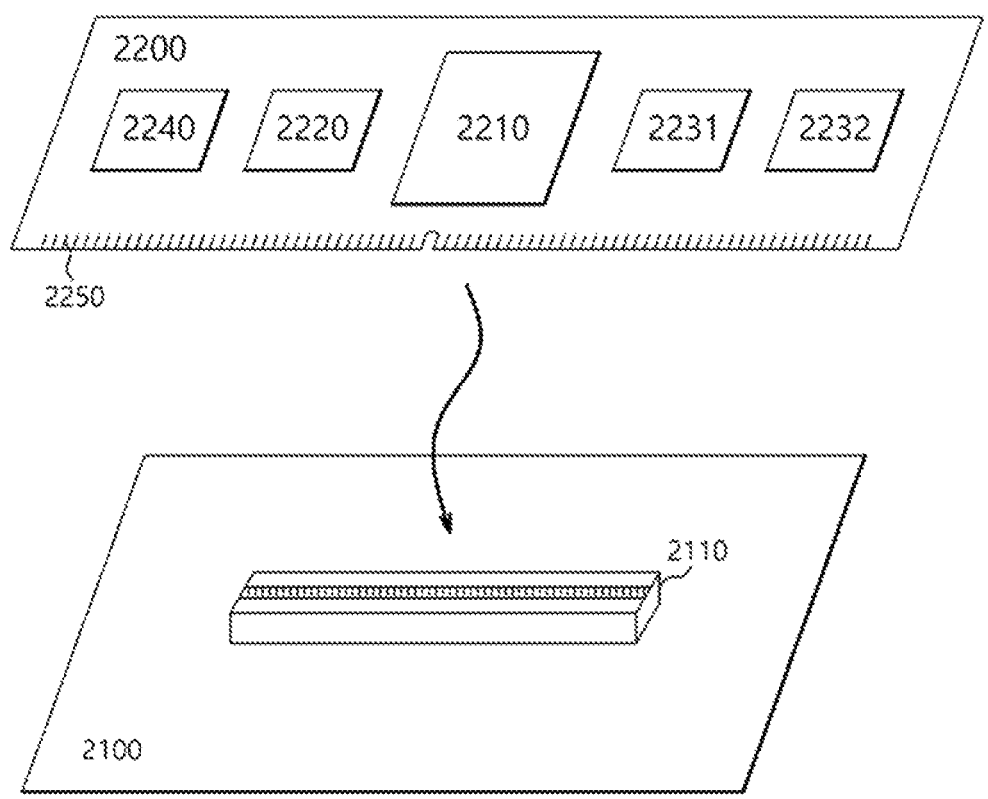
FIG. 7 is a diagram illustrating a data processing system including a data storage device in accordance with an embodiment of the present invention.

FIG. 7 is a diagram illustrating a data processing system including a data storage device in accordance with an embodiment of the present invention. Referring to FIG. 7, a data processing system 2000 may include a host device 2100 and a data storage device 2200.

The host device 2100 may be constructed in the form of a board such as a printed circuit board. Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be constructed in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 5.

The buffer memory device 2220 may temporarily store data to be stored in the nonvolatile memory devices 2231 and 2232. Further, the buffer memory device 2220 may temporarily store the data read out from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be constructed into various types depending on an interface scheme between the host device 2100 and the data storage device 2200. The connection terminal 2250 may be disposed on any one side of the data storage device 2200.

Figure 8:
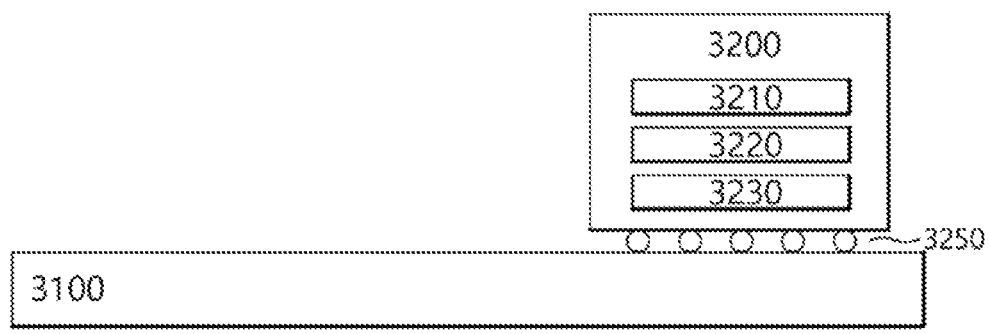
FIG. 8 is a diagram illustrating a data processing system including a data storage device in accordance with an embodiment of the present invention.

FIG. 8 is a diagram illustrating a data processing system including a data storage device in accordance with an embodiment of the present invention. Referring to FIG. 8, a data processing system 3000 may include a host device 3100 and a data storage device 3200.

The host device 3100 may be constructed in the form of a board such as a printed circuit board. Although not shown, the host device 3100 may include internal function blocks for performing the function of a host device.

The data storage device 3200 may be constructed in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 5.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 9:
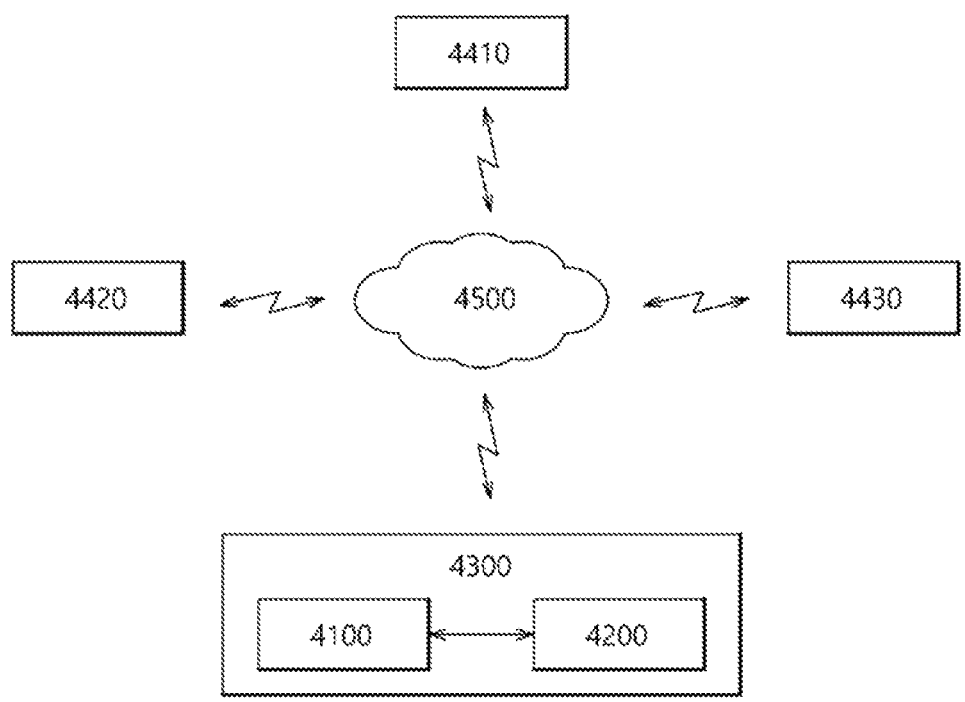
FIG. 9 is a diagram illustrating a network system including a data storage device in accordance with an embodiment of the present invention.

FIG. 9 is a diagram illustrating a network system including a data storage device in accordance with an embodiment of the present invention. Referring to FIG. 9, a network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and a data storage device 4200. The data storage device 4200 may be constructed by the data storage device 100 shown in FIG. 1, the data storage device 1200 shown in FIG. 5, the data storage device 2200 shown in FIG. 7 or the data storage device 3200 shown in FIG. 8.

Figure 10:
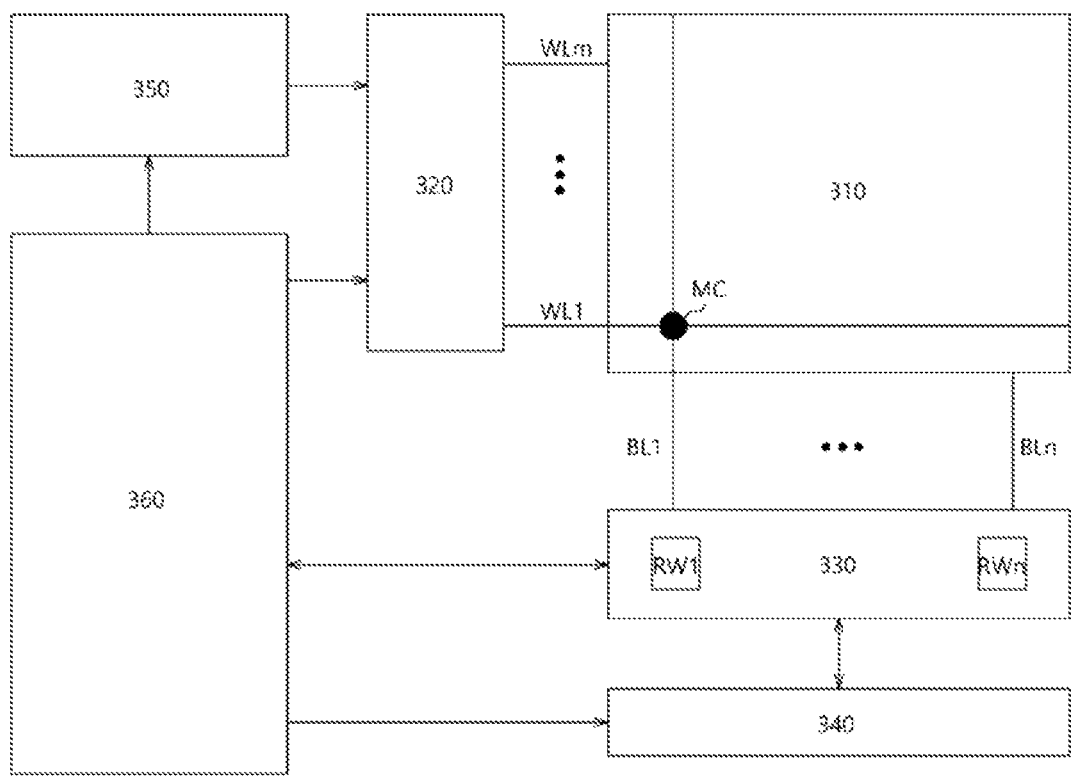
FIG. 10 is a block diagram illustrating an exemplary configuration of a nonvolatile memory device included in a data storage device in accordance with an embodiment of the present invention.

FIG. 10 is a block diagram illustrating an exemplary configuration of a nonvolatile memory device included in a data storage device in accordance with an embodiment of the present invention. Referring to FIG. 10, a nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm and selection lines, e.g., source and drain select lines (not shown). The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to one or more of the word lines WL1 to WLm depending upon the operation mode and an address provided by the control logic.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the present invention should not be limited only to the described embodiments.

What is claimed is:

1. A method for performing garbage collection for a memory device by a controller controlling the memory device, the method comprising:
   obtaining an average of an (n−2)th garbage collection throughput and an (n−1)th garbage collection throughput;
   summing the average and a number of used empty memory blocks of the memory device, to obtain a first value;
   obtaining a percentage of a number of used pages of an open memory block to an amount of write data;
   determining by the controller, the nth garbage collection throughput by multiplying the first value and the percentage; and
   performing, by the controller, a garbage collection operation based on the nth garbage collection throughput.

2. The method according to claim 1, wherein the number of used empty memory blocks is a subtraction of the number of remaining empty memory blocks from the number of minimum empty memory blocks.

3. The method according to claim 1, wherein the amount of write data is the maximum number of pages to be written to process write data.

4. The method according to claim 1, wherein the open memory block includes at least a used page in which data is written and at least an empty page.

5. A data storage device comprising:
   a memory device; and
   a controller to control the memory device,
   wherein the controller includes
   a memory including a garbage collection module; and
   a control unit executing the garbage collection module,
   wherein the controller determines an nth garbage collection throughput by multiplying a rate of a number of used pages of an open memory block to an amount of write data to be processed to a sum of the number of used empty memory blocks and an immediately previous garbage collection throughput average value, and
   wherein the controller performs a garbage collection operation based on the nth garbage collection throughput.

6. The data storage device according to claim 5, wherein the number of used empty memory blocks is a subtraction of the number of remaining empty memory blocks from the number of minimum empty memory blocks.

7. The data storage device according to claim 5, wherein the immediately previous garbage collection throughput average value is an average of an (n−2)th garbage collection throughput and an (n−1)th garbage collection throughput.

8. The data storage device according to claim 5, wherein the amount of write data is obtained by ceiling a resultant value of dividing an amount of write data by a size of a page.

9. The data storage device according to claim 5, wherein the open memory block includes at least a used page in which data is written and at least an empty page.

10. The data storage device according to claim 5, wherein the memory device is a nonvolatile memory device.

11. The data storage device according to claim 10, wherein the memory device is a flash memory device.

* * * * *